(12) United States Patent
Nagale et al.

(10) Patent No.: US 12,553,826 B2
(45) Date of Patent: Feb. 17, 2026

(54) MULTI-BEAM SMOKE DETECTOR

(71) Applicant: Tyco Fire & Secuirty GmbH, Neuhausen am Rheinfall (CH)

(72) Inventors: Siddhesh Nagale, Pune (IN); Vicky Gaikwad, Pune (IN); Vinod Waghmare, Pune (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 103 days.

(21) Appl. No.: 18/462,206

(22) Filed: Sep. 6, 2023

(65) Prior Publication Data

US 2025/0076196 A1 Mar. 6, 2025

(51) Int. Cl.
*G01N 21/47* (2006.01)
*G08B 17/103* (2006.01)

(52) U.S. Cl.
CPC ....... *G01N 21/4738* (2013.01); *G08B 17/103* (2013.01)

(58) Field of Classification Search
CPC ...... G01N 21/53; G01N 21/49; G01N 21/532; G01N 15/06; G01N 15/075; G01N 15/1433; G01N 2021/1765; G01N 21/17; G01N 2201/06113; G01N 33/0031; G01N 2201/022; G01N 21/274; G01N 21/65; G01N 2201/127; G01N 2015/0046; G01N 2201/0633; G01N 2021/1793; G01N 21/15; G01N 21/658; G01N 2201/0221; G01N 2201/129; G01N 2201/1296; G01N 15/0205; G01N 15/1434; G01N 15/10; G01N 15/1459; G01N 21/01; G01N 21/05; G01N 21/538; G01N 2201/061; G01N 2201/062; G01N 2201/0621; G01N 2201/0627; G01N 2201/0696; G01N 33/0027; G01N 2021/4742; G01N 2021/4792; G01N 2201/08; G01N 21/0303; G01N 21/4738; G01N 21/534; G01N 21/84; G01N 2201/065; G01N 15/0211;
(Continued)

(56) References Cited

U.S. PATENT DOCUMENTS 5,502,434 A 3/1996 Minowa et al.
2010/0194574 A1* 8/2010 Monk .................. G01N 15/06
340/627
(Continued)

FOREIGN PATENT DOCUMENTS

CA 2727113 C * 4/2017 .......... G08B 17/107
CN 101952709 A 1/2011
(Continued)

*Primary Examiner* — Michael P Stafira
(74) *Attorney, Agent, or Firm* — ArentFox Schiff LLP (57) ABSTRACT

Example implementations include a method and apparatus for operating a smoke detector, comprising a first beam emitter and a second beam emitter. The first beam emitter may be configured to: (i) radiate a first beam in a first direction toward a first reflecting element, and (ii) receive a first reflection of the first beam from the first reflecting element. The second beam emitter may be configured to: (i) radiate a second beam in a second direction toward a second reflecting element, wherein the first direction is different than the second direction, and (ii) receive a second reflection of the second beam from the second reflecting element.

20 Claims, 9 Drawing Sheets

(58) Field of Classification Search
CPC ........... G01N 15/0606; G01N 15/1456; G01N 21/25; G01N 21/552; G01N 21/85; G01N 33/0063; G08B 17/107; G08B 17/113; G08B 17/103; G08B 29/043; G08B 17/10; G08B 17/125; G08B 29/185; G08B 29/145; G08B 29/24; G08B 17/117; G08B 25/10; G08B 29/20; G08B 21/12; G08B 29/183; G08B 29/22; G08B 29/18; G08B 29/28; G08B 13/184; G08B 19/00; G08B 29/04; G08B 17/00; G08B 17/12; G08B 25/003; G08B 13/1618; G08B 21/182; G08B 21/22; G08B 27/001; G08B 29/02; G08B 29/188; G08B 29/26; G08B 7/06; G08B 7/064; G08B 17/06; G08B 21/02; G08B 21/14; G08B 21/18; G08B 25/001; G08B 25/007; G08B 25/008; G08B 29/00; G08B 6/00
See application file for complete search history.

(56) References Cited

U.S. PATENT DOCUMENTS

| | | |
|---|---|---|
| 2011/0221889 A1 | 9/2011 | Knox et al. |
| 2021/0065536 A1 | 3/2021 | Dearden et al. |
| 2021/0304573 A1* | 9/2021 | Escofet Via ....... G08B 13/1895 |

FOREIGN PATENT DOCUMENTS

| | | | |
|---|---|---|---|
| JP | H05340873 A | * | 12/1993 |
| JP | 2022123404 A | * | 8/2022 |

* cited by examiner

MULTI-BEAM SMOKE DETECTOR

TECHNICAL FIELD

The present disclosure generally relates to beam-detection fire alarm systems. More particularly, the present disclosure relates to a multi-beam smoke detector.

BACKGROUND

Fire alarm systems are often installed within a premises such as commercial, residential, or governmental buildings. Examples of these buildings include offices, hospitals, warehouses, schools or universities, shopping malls, government offices, and casinos. The fire alarm systems typically include fire alarm devices deployed within the buildings that are directly wired to a fire alarm panel, although wireless systems are becoming more common. The fire alarm devices include alarm notification devices such as sirens and strobe lights that alert occupants of the building of potential fire conditions, and fire sensor devices that detect indications of fire such as heat, smoke, flame, and carbon monoxide, in examples.

For open-area smoke detection, a beam detector system may be used, wherein the system may sense smoke by projecting a light beam from a transceiver unit across the protected area to a reflector that returns the light signal back to the transceiver unit. Smoke entering the beam path will decrease the light signal causing an alarm. However, such a beam detection system requires a significant number transceiver units because of range limitations associated with systems that require both transmission of light and transmission of a reflection of that light. Moreover, coving a large area with such a system requires a significant quantity of transceiver and reflector units in order to maximize the size of a smoke detection area.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a smoke detector, including: a first beam emitter configured to: radiate a first beam in a first direction toward a first reflecting element; and receive a first reflection of the first beam from the first reflecting element; and a second beam emitter configured to: radiate a second beam in a second direction toward a second reflecting element, wherein the first direction is different than the second direction; and receive a second reflection of the second beam from the second reflecting element.

In some aspects, the techniques described herein relate to a method of smoke detection, including: radiating, via a first beam emitter, a first beam in a first direction toward a first reflecting element; receiving, via the first beam emitter, a first reflection of the first beam from the first reflecting element; radiating, via a second beam emitter, a second beam in a second direction toward a second reflecting element, wherein the first direction is different than the second direction; and receiving, via the second beam emitter, a second reflection of the second beam from the second reflecting element.

In some aspects, the techniques described herein relate to an apparatus for smoke detection, including: means for radiating a first beam in a first direction toward a first reflecting element; means for receiving a first reflection of the first beam from the first reflecting element; means for radiating a second beam in a second direction toward a second reflecting element, wherein the first direction is different than the second direction; and means for receiving a second reflection of the second beam from the second reflecting element.

In some aspects, the techniques described herein relate to a non-transitory computer-readable storage medium having instructions stored thereon for smoke detection, including: radiating, via a first beam emitter, a first beam in a first direction toward a first reflecting element; receiving, via the first beam emitter, a first reflection of the first beam from the first reflecting element; radiating, via a second beam emitter, a second beam in a second direction toward a second reflecting element, wherein the first direction is different than the second direction; and receiving, via the second beam emitter, a second reflection of the second beam from the second reflecting element.

In some aspects, the techniques described herein relate to an apparatus for smoke detection, including: means for radiating a first beam; means for receiving the radiated beam; and means for splitting the radiated beam into a first split beam and a second split beam, wherein the first split beam is radiated in a first direction toward a first reflecting element, and wherein the second split beam is radiated in a second direction toward a second reflecting element.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Beam-type smoke detectors may measure the presence and concentration of smoke across an open area using a beam (e.g., a laser and/or light) and reflector. Aspects described herein relate to a smoke detector/fire alarm system implemented as a single unit having multiple beam emitters configured to radiate beams in different directions. In some examples, a beam emitter may function as a transceiver to the extent it both radiates (e.g., transmits) and detects (e.g., receives) beams.

In certain aspects, a single unit having multiple beam emitters may provide a relatively wider coverage area relative to a single unit having only one beam emitter. With a multi-emitter configuration, a single housing may transmit multiple beams in different directions, with each beam being radiated toward a separate reflector. For example, a single unit may include eight emitters with each emitter being directed 45° from an adjacent emitter, thereby providing 360° of coverage. In this example, the single unit may be installed in the center of a building area or large room, thereby reducing the number of emitters required (e.g., a single unit having 8 emitters rather than 8 units each having only one emitter). Other configurations may be used as well, where a single unit may have fewer or more emitters.

Figure 1:
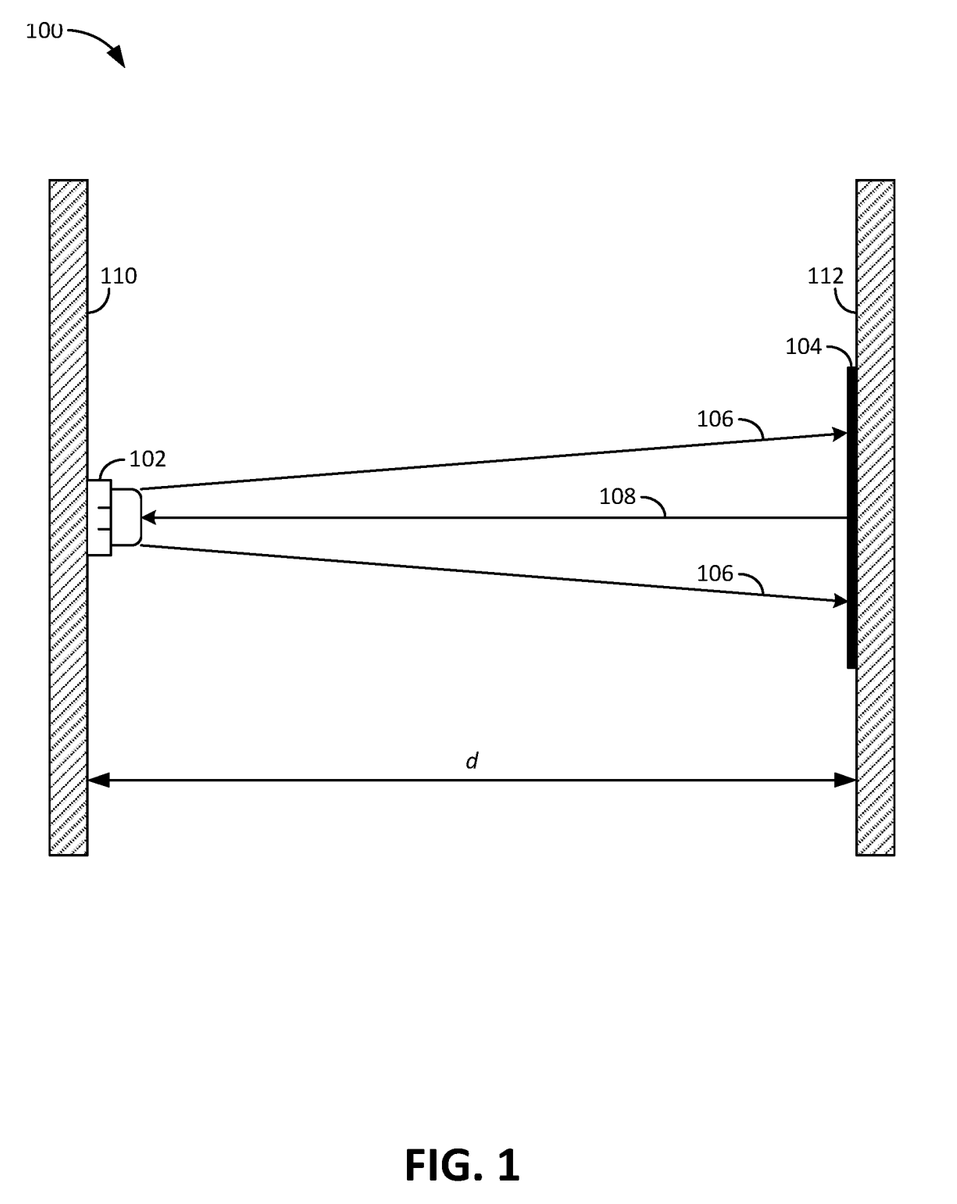
FIG. 1 is a side view block diagram conceptually illustrating an example of a beam-type smoke detector environment.

FIG. 1 is a block diagram conceptually illustrating an example of a beam-type smoke detector environment 100. In some examples, beam smoke detectors emit a projected beam of light to detect smoke across large areas, typically as an indicator of fire. Beam detectors offer an economical and practical alternative to standard point smoke detectors which may not be appropriate for use for tall buildings or rooms, or certain building designs. Beam-type smoke detectors installed in relatively larger areas may require multiple beam detectors due to ranges and conventional beam-type detectors having only one beam emitter.

As discussed, beam-type detectors work on the principle of light obscuration, where the presence of smoke blocks some of the light from the beam, typically through either absorbance or light scattering. Once a certain percentage of the transmitted light has been blocked by the smoke, the detector may trigger an alert of a fire. Thus, an emitter and a reflector are configured to have a clear line of sight between them for beam-type detectors.

As illustrated, FIG. 1 includes a beam-type detector 102 installed on a first structure 110 (e.g., a wall, floor, or ceiling, column, etc.). A reflector 104 is installed on an opposite structure 112 (e.g., a wall, floor, or ceiling, column, etc.) and positioned to receive a radiated beam 106 from an emitter of the detector 102. The reflector 104 is configured to provide a reflected beam 108 back to the detector 102 which measures an intensity of the reflected beam 108. A distance (d) between the first structure 110 and the opposite structure 112 may be any suitable distance and may typically be between 26 feet and 330 feet.

Figure 2:
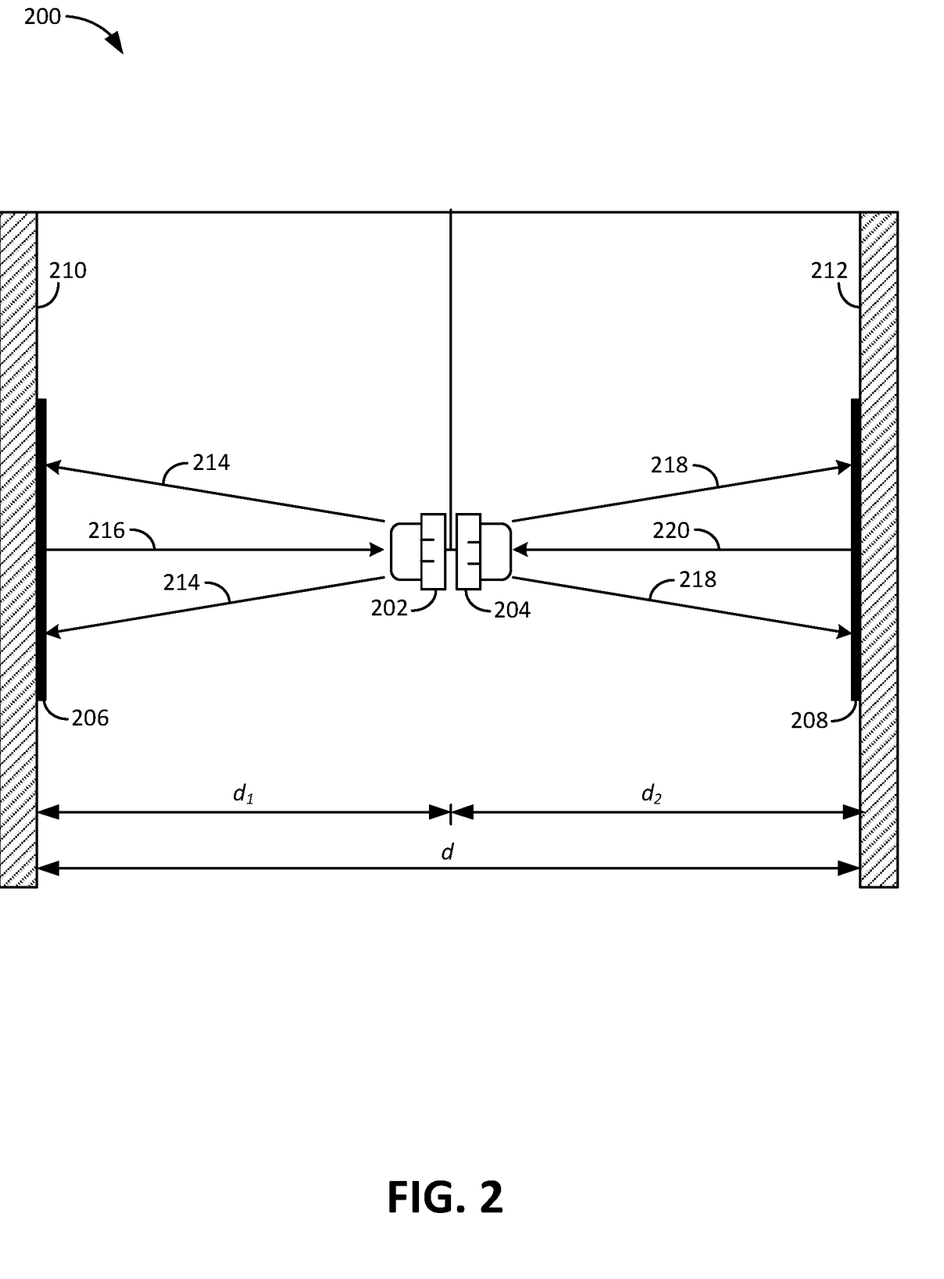
FIG. 2 is a side view block diagram conceptually illustrating another example of a beam-type smoke detector environment.

FIG. 2 is a block diagram conceptually illustrating another example of a beam-type smoke detector environment 200. As noted earlier, a beam type detector typically includes only a single beam emitter having a single reflector. Thus, in order to extend coverage of fire detection, multiple beam-type detectors are necessary as are corresponding reflectors.

Here, a first beam-type detector 202 and a second beam-type detector 204 are installed in a building area or room and face opposite directions to maximize a total coverage area. As is found in conventional beam detectors, each detector includes one beam emitter (e.g., laser or other light or wavelength). A first reflector 206 is installed on a first structure 210 opposite to the first beam-type detector, and a second reflector 208 is installed on a second structure 212 opposite the second beam-type detector 204.

The first beam-type detector 202 transmits a first beam 214 to the first reflector 206 which reflects back a first reflected beam 216. Similarly, the second beam-type detector 204 transmits a second beam 218 to the second reflector 208 which reflects back a second reflected beam 220.

A smoke detector configuration as illustrated may be used when a building area or room is greater than the range of a beam-type detector. For example, if a wall-to-wall distance (d) building area is 600 feet, it may exceed the range ($d_1$, $d_2$) of a beam-type detector by 300 feet. Thus, a configuration like that of FIG. 1 may not provide reliable smoke detection. Accordingly, in the illustrated example, multiple beam detectors may be installed from a ceiling fixture in the center of the building area to ensure that the beam detectors are within an appropriate range of their respective reflectors.

However, with the configuration illustrated in FIG. 2, a significant number of beam detectors may be required to ensure that the building area has comprehensive beam coverage.

Examples of Multi-Beam Detectors

Figure 3:
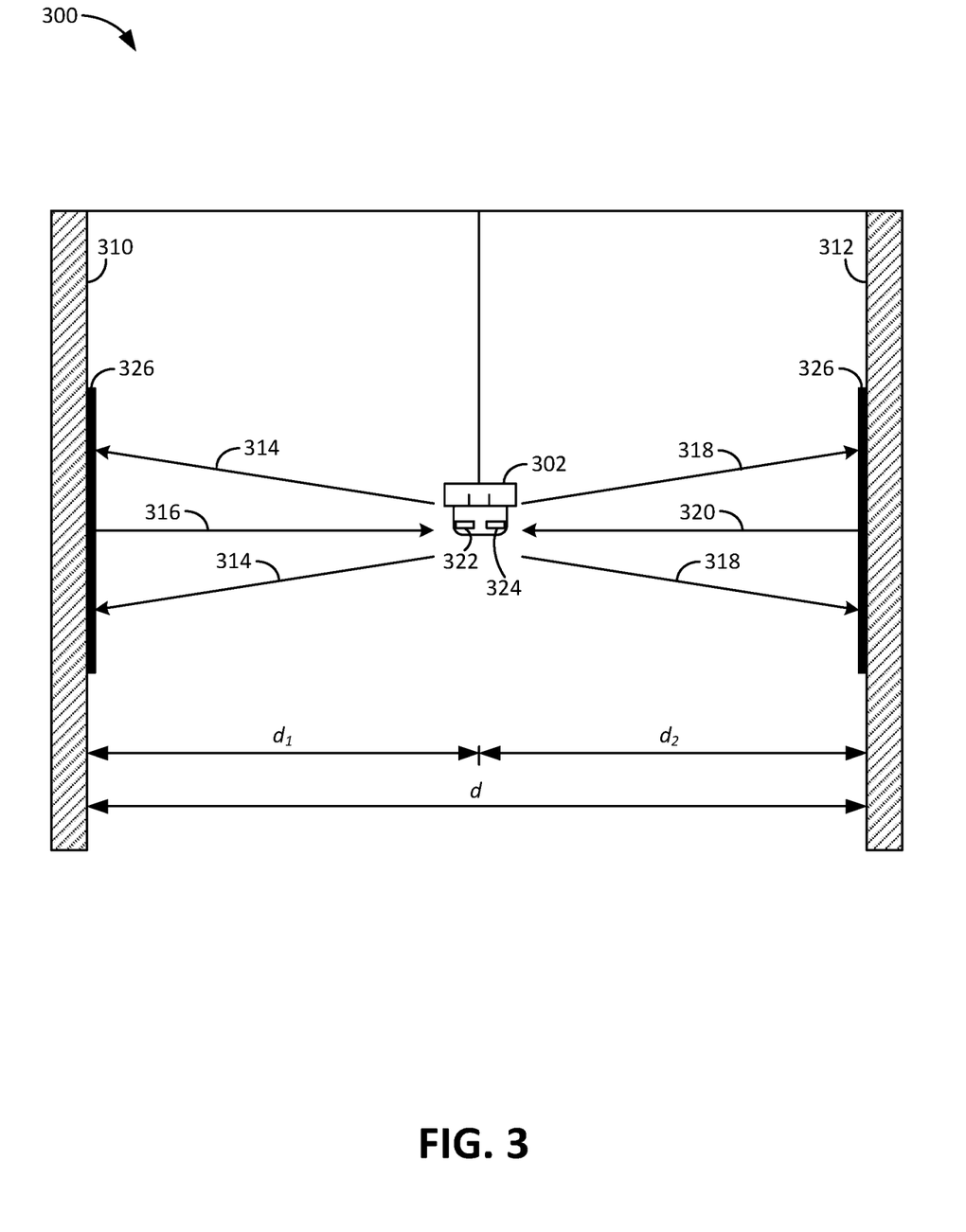
FIG. 3 is a side view block diagram illustrating an example of a single beam-type detector using multiple beam emitters and/or a beam splitter.

FIG. 3 is a block diagram illustrating an example 300 of a single beam-type detector 302 using multiple beam emitters and/or a beam splitter. In this example, similar to that shown in FIG. 2, an ideal detector installation may require locating the beam-type detector 302 such that it hangs or is otherwise attached to a ceiling. For example, if the total distance (d) between two walls of a building area is greater than a maximum range ($d_1$, $d_2$) of the detector.

The detector 302 includes multiple beam emitters, including a first beam emitter 322 and a second beam emitter 324. As illustrated, the first beam emitter 322 radiates a beam in a first direction and the second beam emitter 324 radiates a beam in a second direction that is 180° relative to the first direction. The first emitter 322 transmits a first beam 314 that is reflected to the first emitter 322 via a reflected beam 316. Similarly, the second emitter 324 transmits a second beam 318 that is reflected to the second emitter 324 via a reflected beam 320. Although FIG. 3 illustrates a detector with two emitters, any suitable number of emitters may be included with the detector 302 based on the location of the detector 302, the size of the building area, etc. As shown, the example includes at least one reflector for each emitter. The at least one reflector 326 may be installed on any suitable structural surface (e.g., first structure 310, second structure 312) that provides unobstructed line-of-sight between an emitter and a corresponding reflector.

Figure 4:
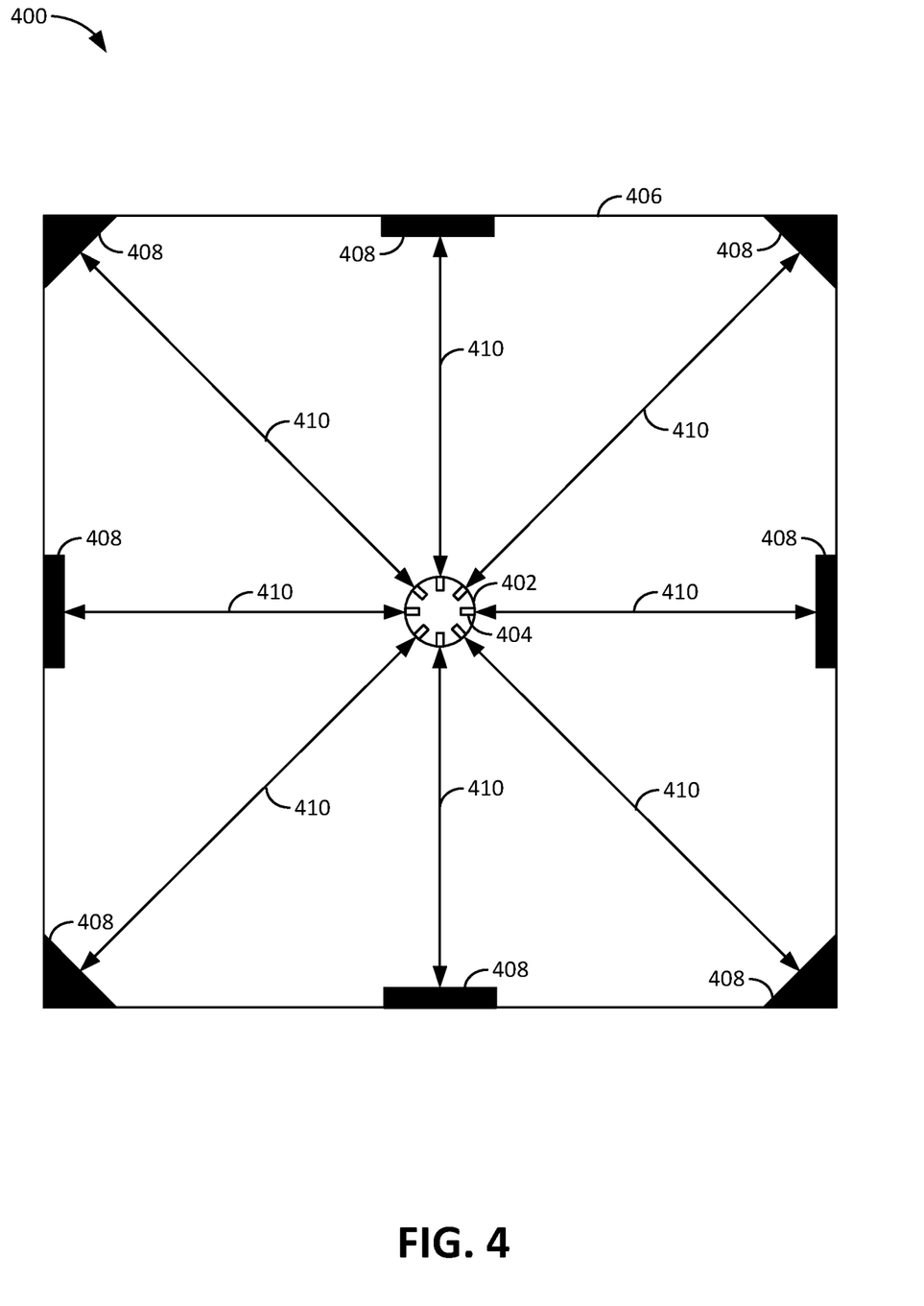
FIG. 4 is a top view block diagram illustrating an example installation of a beam-type detector within a building area.

FIG. 4 is a block diagram illustrating an example installation 400 of a beam-type detector 402 within a building area 406. Although the building area 406 is illustrated as a square shaped region, the building area 406 may be defined by any shape. The detector 402 may be installed on a ceiling or other structural element. The example installation 400 includes multiple reflectors 408 positioned at all four corners and walls of the building area 406. In some examples, one or more of the reflectors 408 may be positioned on a floor or other structural element.

The detector 402 is illustrated as including eight emitters 404, each configured to radiate a beam in a direction toward a corresponding reflector 408. As illustrated, there is a 1-to-1 correspondence between emitters 404 and reflectors 408, thereby providing eight paths 410 for a radiated beam and a reflection of the beam between the detector 402 and the reflectors 408. It should be noted that other correspondence ratios may be used.

As illustrated, a single detector 402 having multiple emitters may be employed to provide 360° coverage of a building area 406. This reduces the number of detectors necessary to provide adequate coverage of a building. For example, a conventional detector may include a single emitter, thus in order to achieve the smoke detection coverage illustrated, a user would need eight conventional detectors in the building area 406.

Figure 5:
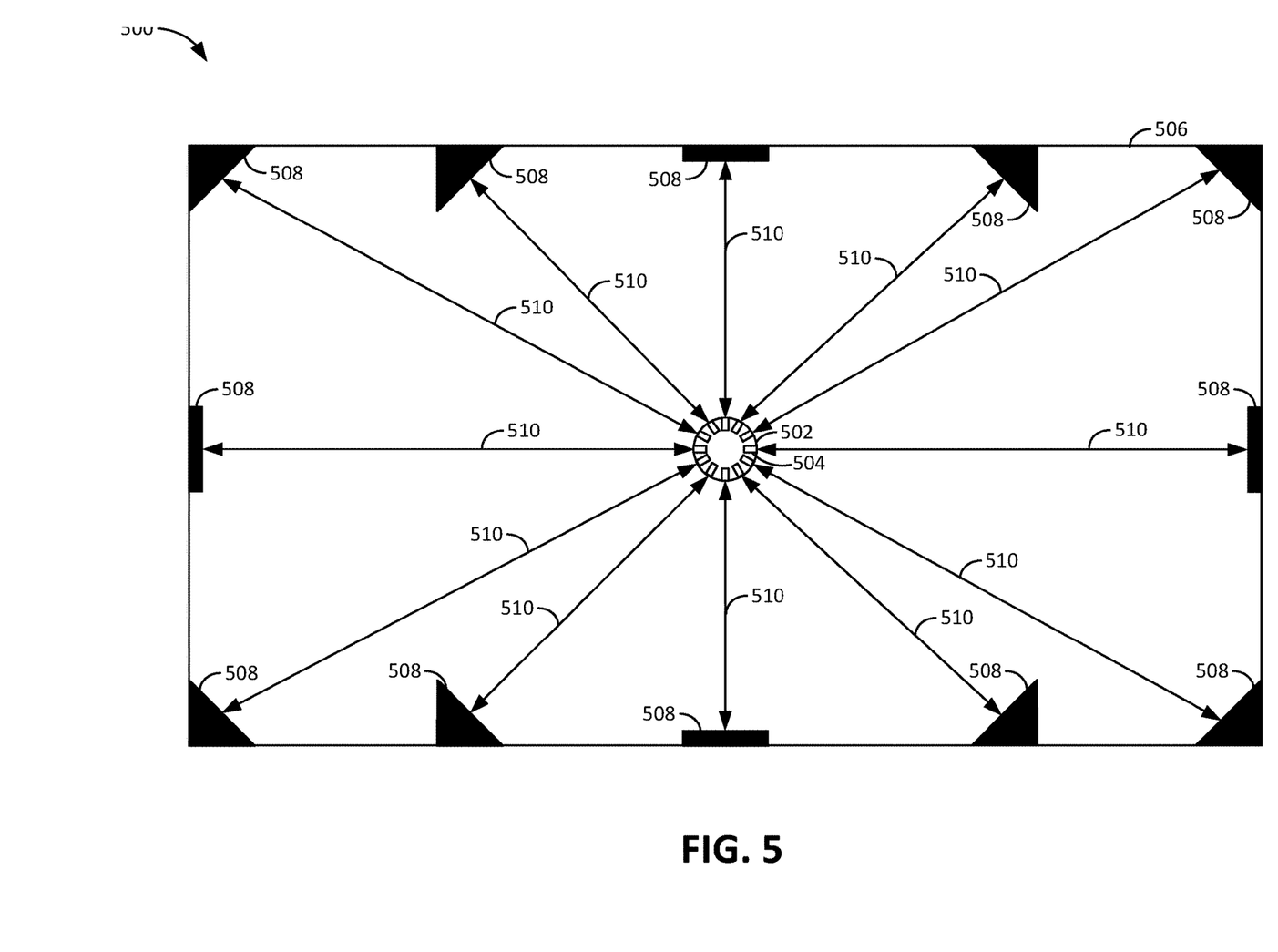
FIG. 5 is a top view block diagram illustrating another example installation of a beam-type detector within a building area.

FIG. 5 is a block diagram illustrating another example installation 500 of a beam-type detector 502 within a building area 506. In this example, the building area 506 is rectangular shaped, and thus, the detector may include more emitters 504 relative to the example in FIG. 4. In this example installation, multiple reflectors 508 are located along each of four walls, with more reflectors occupying the two longer walls in improve smoke detection coverage. For example, with more reflectors, there are more paths 510 for beam radiation and reflection.

In certain aspects, the detectors illustrated in FIGS. 3-5 may include a housing or other structural mechanism for securely attaching multiple beam emitters, wherein each of the multiple beam emitters is configured to radiate a beam in a unique direction relative to other of the multiple beam emitters. In some examples, the housing may provide a protective container for the multiple beam emitters.

In certain aspects, each beam emitter of the multiple beam emitters may point in a direction that is N degrees away from another direction of a neighboring beam emitter. where N is a number. For example, a first beam emitter may point and radiate a beam in a first direction, and a second beam emitter may point and radiate a beam in a second direction. The first direction may be 180° degrees relative to the second direction. In some examples, the first direction is orthogonal to the second direction.

Figure 6:
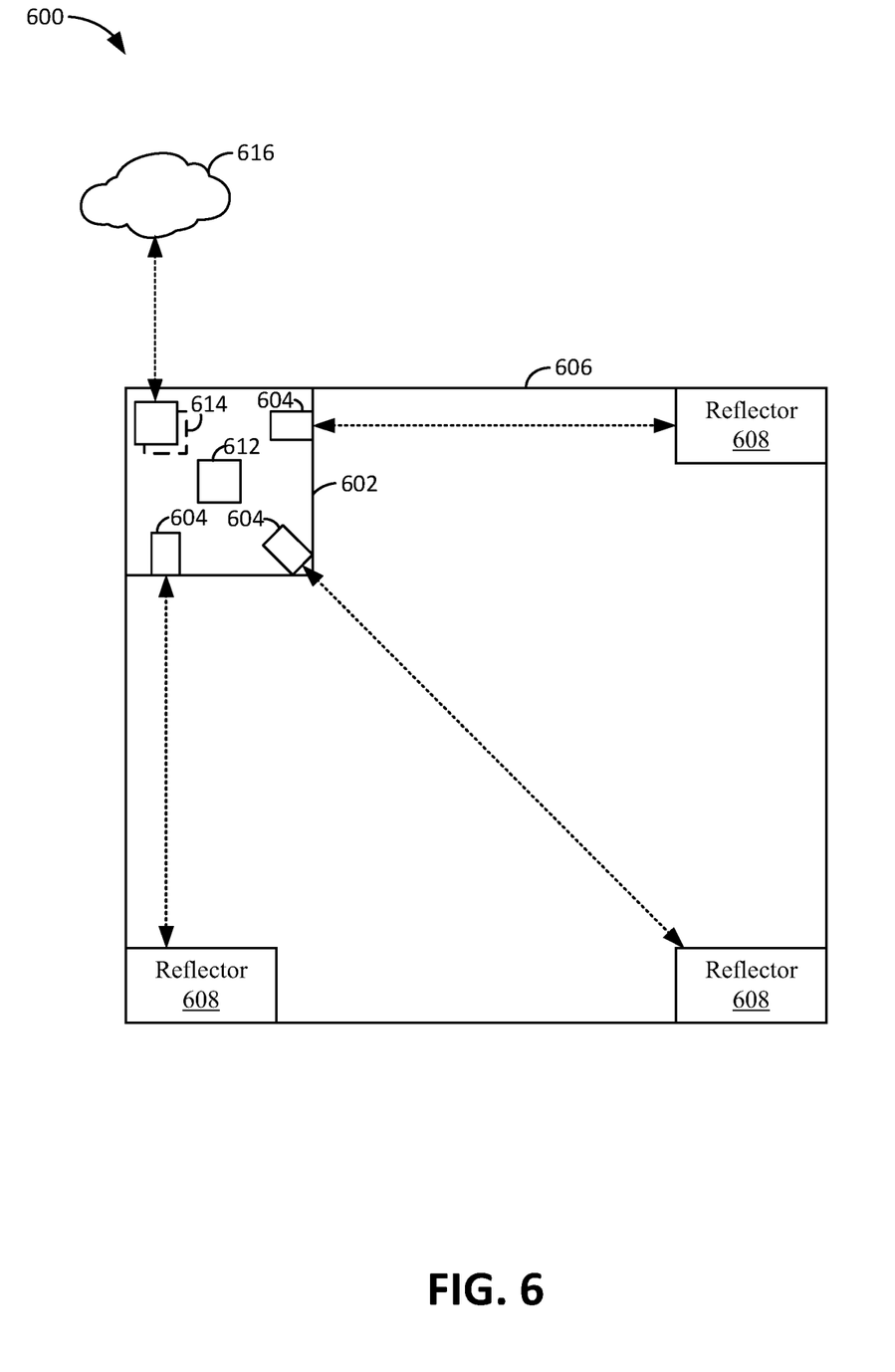
FIG. 6 is a top view block diagram conceptually illustrating an example smoke detecting system.

FIG. 6 is a block diagram conceptually illustrating an example smoke detecting system 600. A beam-type detector 602 may be installed within a building area 606 and may include multiple reflectors 608 installed within line-of-sight of the detector 602. The detector 602 may include multiple beam emitters 604, an alert mechanism 612, and one or more processors 614. The multiple beam emitters 604 may each radiate a beam in a particular direction toward a corresponding reflector 608.

The alert mechanism 612 may include an audible alert (e.g., an alarm noise) and/or a visual alert (e.g., a flashing light or a siren). Although the alert mechanism is illustrated as being part of the detector 602, it may also be external to the detector 602. The one or more processors 614 may perform measurements and trigger the alert mechanism 612 as discussed in more detail below. In some examples, the one or more processors 614 may include a wireless communication modem configured for WiFi LAN/WLAN connection (e.g., with an intranet/internet 616). Such a connection may allow the one or more processors 614 to communicate a message indicating a fire to a fire department or other emergency service.

Figure 7:
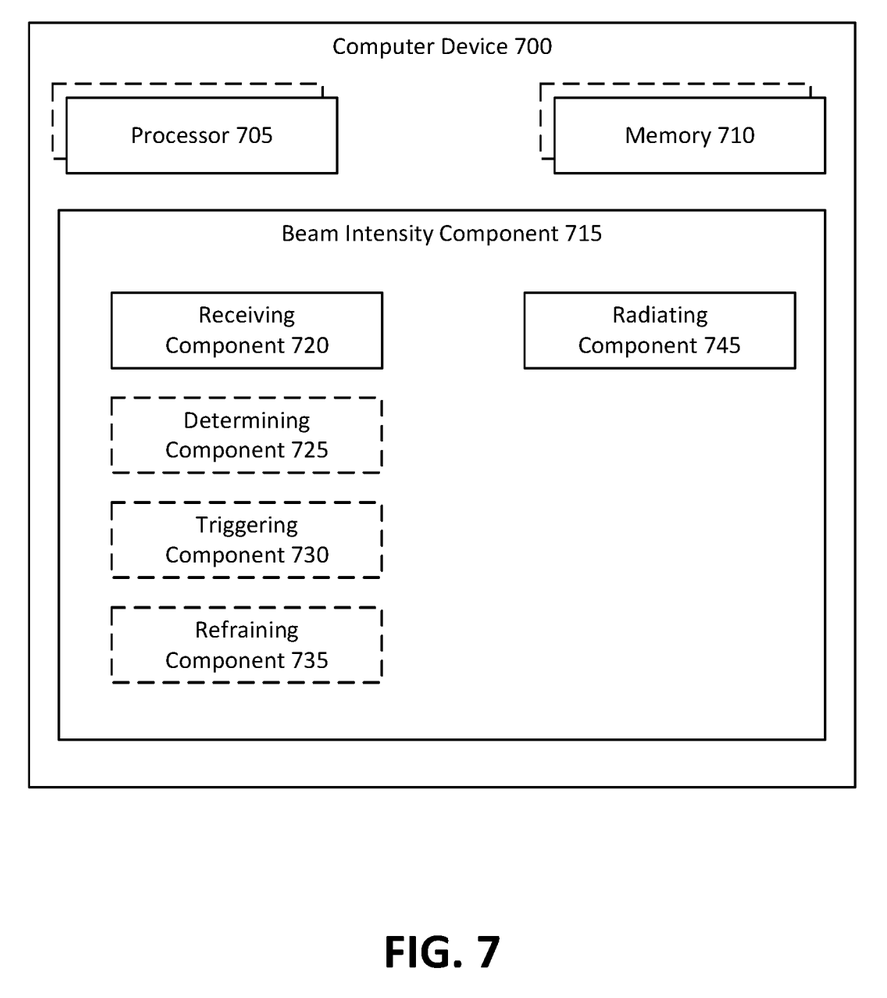
FIG. 7 is a block diagram of an example of a computer device having components configured to perform a method of operating a smoke detector.
Figure 8:
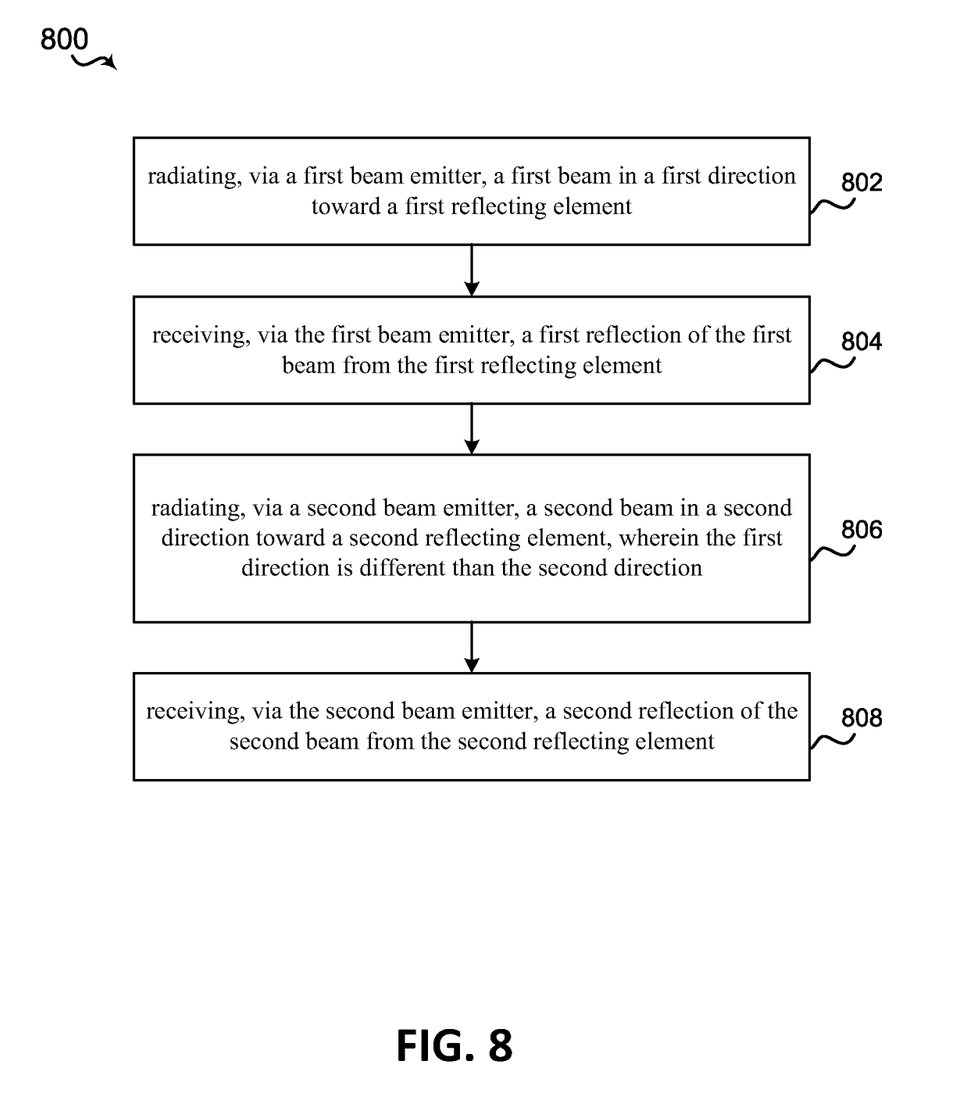
FIG. 8 is a flowchart of an example of a method of operating a smoke detector.
Figure 9:
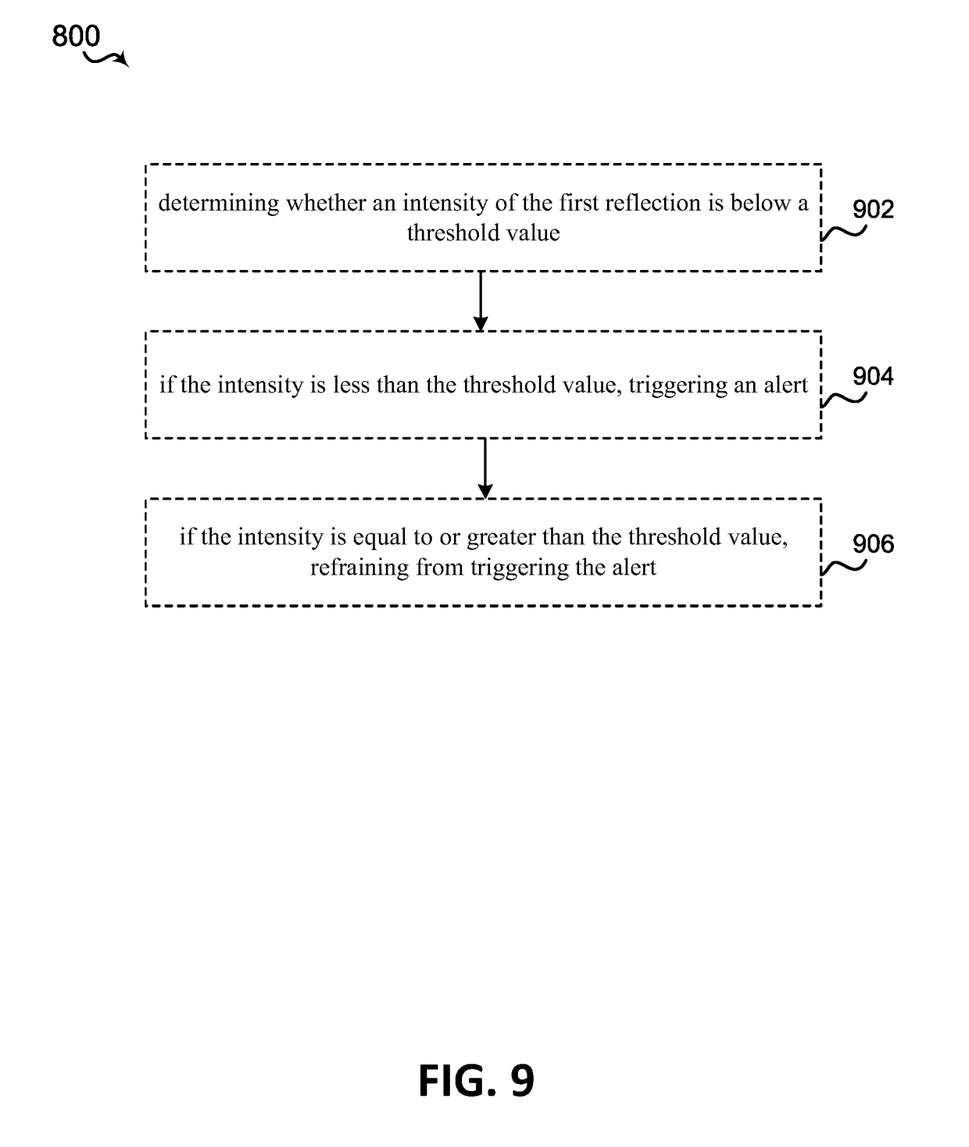
FIG. 9 is a flowchart of additional aspects of the method of FIG. 8.

Referring to FIGS. 7, 8, and 9, in operation, computer device 700 may perform a method 800 of operating a smoke detector, via execution of a beam intensity component 715 by one or more processors 705 (e.g., the one or more processors 614 of FIG. 6) and/or one or more memories 710.

At block 802, the method 800 includes radiating, via a first beam emitter, a first beam in a first direction toward a first reflecting element. For example, in an aspect, computer device 700, one or more processors 705, one or more memories 710, beam intensity component 715, and/or radiating component 745 may be configured to or may comprise means for radiating, via a first beam emitter, a first beam in a first direction toward a first reflecting element.

For example, the radiating at block 802 may be performed by a beam emitter. Here, the beam emitter may radiate a first beam directed to a first reflecting element, and receive a reflection of that first beam from the reflecting element. In some examples, the first reflecting element may be any suitable passive/active reflecting surface, such as a mirror, intelligent reflecting surface (IRS), etc.

At block 804, the method 800 includes receiving, via the first beam emitter, a first reflection of the first beam from the first reflecting element. For example, in an aspect, computer device 700, one or more processors 705, one or more memories 710, beam intensity component 715, and/or receiving component 720 may be configured to or may comprise means for receiving, via the first beam emitter, a first reflection of the first beam from the first reflecting element.

For example, the receiving at block 804 may include receiving a reflection of the first beam. If smoke crosses a path of the first beam and/or the reflection of the first beam, then the affected beam(s) may experience beam diffraction. In this case, because less of the beam is returning to the beam emitter, the intensity of the beam is reduced. If the intensity of the beam falls below a threshold value, then the one or more processors 705 may determine that smoke has been detected.

At block 806, the method 800 includes comparing the intensity with a threshold value. For example, in an aspect, computer device 700, one or more processors 705, one or more memories 710, beam intensity component 715, and/or radiating component 745 may be configured to or may comprise means for radiating, via a second beam emitter, a second beam in a second direction toward a second reflecting element, wherein the first direction is different than the second direction.

For example, the radiating at block 806 may include radiating a second beam in a direction that is different from a direction associated with the first beam. In this manner. the smoke detector may emit multiple beams in multiple different directions from a single hub or apparatus.

At block 808, the method 800 includes receiving, via the second beam emitter, a second reflection of the second beam from the second reflecting element. For example, in an aspect, computer device 700, one or more processors 705, one or more memories 710, beam intensity component 715, and/or receiving component 720 may be configured to or may comprise means for receiving, via the second beam emitter, a second reflection of the second beam from the second reflecting element.

For example, the receiving at block 808 may include receiving a reflection of the second beam. As such, the smoke detector may transmit multiple beams via multiple emitters, wherein each emitter is also configured to receive a reflection of a corresponding beam that it radiated (e.g., transmitted).

Referring to FIG. 9, in an alternative or additional aspect, at block 902, the method 800 may further include determining whether an intensity of the first reflection is below a threshold value. For example, in an aspect, computer device 700, one or more processors 705, one or more memories 710, beam intensity component 715, and/or determining component 725 may be configured to or may comprise means for determining whether an intensity of the first reflection is below a threshold value.

For example, if an intensity of the beam reflection received is measured and is less than a threshold value, then the smoke detector may determine that smoke or another object is blocking/diffusing the beam between an emitter and reflector.

At block 904, the method 800 includes triggering an alert if the intensity is less than the threshold value. For example, in an aspect, computer device 700, one or more processors 705, one or more memories 710, beam intensity component 715, and/or triggering component 730 may be configured to or may comprise means for triggering an alert if the intensity is less than the threshold value.

For example, the triggering at block 904 may include triggering an audible and/or visual alert, and/or initiating a wired or wireless communication via a LAN/WLAN network. In some examples, any suitable alert configured to indicate a fire may be triggered.

At block 906, the method 800 includes refraining from triggering the alert if the intensity is equal to or greater than the threshold value. For example, in an aspect, computer device 700, one or more processors 705, one or more memories 710, beam intensity component 715, and/or refraining component 735 may be configured to or may comprise means for refraining from triggering the alert if the intensity is equal to or greater than the threshold value.

For example, the refraining at block 906 may include determining that the reflected beam is characterized by a measured intensity value that is expected. In other words, there is nothing blocking or diffusing the reflected beam, and thus, no alert should be triggered.

In an alternative or additional aspect, the smoke detector includes a housing containing multiple beam emitters including the first beam emitter and the second beam emitter, wherein each of the multiple beam emitters is configured to radiate a beam in a unique direction relative to other of the multiple beam emitters.

In an alternative or additional aspect, the first direction is angled N degrees away from the second direction.

In an alternative or additional aspect, the intensity of the first reflection is indicative of whether the first beam has passed through smoke.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Example Aspects

Clause 1. A smoke detector, comprising: a first beam emitter configured to: radiate a first beam in a first direction toward a first reflecting element; and receive a first reflection of the first beam from the first reflecting element; and a second beam emitter configured to: radiate a second beam in a second direction toward a second reflecting element, wherein the first direction is different than the second direction; and receive a second reflection of the second beam from the second reflecting element.

Clause 2. The smoke detector of clause 1, further comprising: a housing containing multiple beam emitters including the first beam emitter and the second beam emitter, wherein each of the multiple beam emitters is configured to radiate a beam in a unique direction relative to other of the multiple beam emitters.

Clause 3. The smoke detector of clause 2, further comprising: multiple reflecting elements including the first reflecting element and the second reflecting element, wherein each of the multiple reflecting elements are configured to: receive a beam from a corresponding one of the multiple beam emitters; and reflect the received beam back to the corresponding one of the multiple beam emitters.

Clause 4. The smoke detector of any of clauses 1-3, wherein the first direction is angled N degrees away from the second direction.

Clause 5. The smoke detector of any of clauses 1-4, further comprising: one or more memories, individually or in combination, having instructions; and one or more processors, individually or in combination, configured to execute the instructions and cause the smoke detector to: determine whether an intensity of the first reflection is below a threshold value; if the intensity is less than the threshold value, trigger an alert; and if the intensity is equal to or greater than the threshold value, refrain from triggering the alert.

Clause 6. The smoke detector of clause 5, wherein the intensity of the first reflection is indicative of whether the first beam has passed through smoke.

Clause 7. The smoke detector of any of clauses 5 and 6, wherein the one or more processors, being configured to trigger the alert, are further configured to: transmit a message indicating a fire to a fire department or other emergency service.

Clause 8. A method of operating a smoke detector, comprising: radiating, via a first beam emitter, a first beam in a first direction toward a first reflecting element; receiving, via the first beam emitter, a first reflection of the first beam from the first reflecting element; radiating, via a second beam emitter, a second beam in a second direction toward a second reflecting element, wherein the first direction is different than the second direction; and receiving, via the second beam emitter, a second reflection of the second beam from the second reflecting element.

Clause 9. The method of clause 8, wherein the smoke detector comprises a housing containing multiple beam emitters including the first beam emitter and the second beam emitter, wherein each of the multiple beam emitters is configured to radiate a beam in a unique direction relative to other of the multiple beam emitters.

Clause 10. The method of any of clauses 8 and 9, wherein the first direction is angled N degrees away from the second direction.

Clause 11. The method of any of clauses 8-11, wherein the method further comprises: determining whether an intensity of the first reflection is below a threshold value; if the intensity is less than the threshold value, triggering an alert; and if the intensity is equal to or greater than the threshold value, refraining from triggering the alert.

Clause 12. The method of clause 11, wherein the intensity of the first reflection is indicative of whether the first beam has passed through smoke.

Clause 13. The method of any of clauses 11 and 12, wherein triggering the alert further comprises transmitting a message indicating a fire to a fire department or other emergency service.

Clause 14. A smoke detection system, comprising: means for radiating a first beam in a first direction toward a first reflecting element; means for receiving a first reflection of the first beam from the first reflecting element; means for radiating a second beam in a second direction toward a second reflecting element, wherein the first direction is different than the second direction; and means for receiving a second reflection of the second beam from the second reflecting element.

Clause 15. The smoke detection system of clause 14, further comprising: means for containing: means for radiating the first beam, means for receiving the first reflection, means for radiating the second beam, and means for receiving the second reflection.

Clause 16. The smoke detection system of any of clauses 14 and 15, wherein the first direction is angled N degrees away from the second direction.

Clause 17. The smoke detection system of any of clauses 14-16, further comprising: means for determining whether an intensity of the first reflection is below a threshold value; means for triggering an alert if the intensity is less than the threshold value; and means for refraining from triggering the alert if the intensity is equal to or greater than the threshold value.

Clause 18. The smoke detection system of clause 17, wherein the intensity of the first reflection is indicative of whether the first beam has passed through smoke.

Clause 19. The smoke detection system of any of clauses 17 and 18, further comprising means for transmitting a message indicating a fire to a fire department or other emergency service.

Clause 20. The smoke detection system of any of clauses 17-19, wherein: means for radiating the first beam in a first direction comprises a first beam emitter; means for receiving the first reflection of the first beam comprises the first beam emitter; means for radiating the second beam in the second direction comprises a second beam emitter; means for receiving the second reflection of the second beam comprises the second beam emitter; means for determining whether the intensity of the first reflection is below a threshold value comprises one or more memories, individually or in combination, having instructions, and one or more processors, individually or in combination, configured to execute the instructions; means for triggering an alert comprises the one or more memories and the one or more processors; and means for refraining from triggering the alert comprises the one or more memories and the one or more processors.

Additional Considerations

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a one or more memories, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X. Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

What is claimed is:

1. A smoke detector, comprising:
  a first beam emitter configured to detect smoke in a first region of a structure:
    radiate a first beam in a first direction toward a first reflecting element; and
    receive a first reflection of the first beam from the first reflecting element; and
  a second beam emitter configured to detect smoke in a second region of the structure different from the first region:
    radiate a second beam in a second direction toward a second reflecting element, wherein the first direction is different than the second direction; and
    receive a second reflection of the second beam from the second reflecting element, wherein the smoke detector is securely fixed to the structure such that, during operation of the smoke detector, there is a continuous one-to-one correspondence between the first beam emitter and the first reflecting element, and a continuous one-to-one correspondence between the second beam emitter and the second reflecting element.

2. The smoke detector of claim 1, further comprising:
  a housing containing multiple beam emitters including the first beam emitter and the second beam emitter, wherein each of the multiple beam emitters is configured to radiate a beam in a unique direction relative to other of the multiple beam emitters.

3. The smoke detector of claim 2, further comprising:
  multiple reflecting elements including the first reflecting element and the second reflecting element, wherein each of the multiple reflecting elements are configured to:
    receive a beam from a corresponding one of the multiple beam emitters; and
    reflect the received beam back to the corresponding one of the multiple beam emitters.

4. The smoke detector of claim 1, wherein the first direction is angled N degrees away from the second direction, and wherein there is no overlap between the first region and the second region.

5. The smoke detector of claim 1, further comprising:
  one or more memories, individually or in combination, having instructions; and
  one or more processors, individually or in combination, configured to execute the instructions and cause the smoke detector to:
    determine whether an intensity of the first reflection is below a threshold value;
    if the intensity is less than the threshold value, trigger an alert; and
    if the intensity is equal to or greater than the threshold value, refrain from triggering the alert.

6. The smoke detector of claim 5, wherein the intensity of the first reflection is indicative of whether the first beam has passed through smoke.

7. The smoke detector of claim 5, wherein the one or more processors, being configured to trigger the alert, are further configured to:
  transmit a message indicating a fire to a fire department or other emergency service.

8. A method of operating a smoke detector, comprising:
  radiating, via a first beam emitter, a first beam in a first direction toward a first reflecting element, wherein the first beam emitter is configured to detect smoke in a first region of a structure;
  receiving, via the first beam emitter, a first reflection of the first beam from the first reflecting element, wherein there is a continuous one-to-one correspondence between the first beam emitter and the first reflecting element;
  radiating, via a second beam emitter, a second beam in a second direction toward a second reflecting element, wherein the first direction is different than the second direction, and wherein second beam emitter configured to detect smoke in a second region of the structure different from the first region; and
  receiving, via the second beam emitter, a second reflection of the second beam from the second reflecting element, wherein there is a continuous one-to-one correspondence between the second beam emitter and the second reflecting element.

9. The method of claim 8, wherein the smoke detector comprises a housing containing multiple beam emitters including the first beam emitter and the second beam emitter, wherein each of the multiple beam emitters is configured to radiate a beam in a unique direction relative to other of the multiple beam emitters.

10. The method of claim 8, wherein the first direction is angled N degrees away from the second direction.

11. The method of claim 8, wherein the method further comprises:
  determining whether an intensity of the first reflection is below a threshold value;
  if the intensity is less than the threshold value, triggering an alert; and
  if the intensity is equal to or greater than the threshold value, refraining from triggering the alert.

12. The method of claim 11, wherein the intensity of the first reflection is indicative of whether the first beam has passed through smoke.

13. The method of claim 11, wherein triggering the alert further comprises transmitting a message indicating a fire to a fire department or other emergency service.

14. A smoke detection system, comprising:
  means for detecting smoke in a first region of a structure, comprising:
    means for radiating a first beam in a first direction toward a first reflecting element; and
    means for receiving a first reflection of the first beam from the first reflecting element, wherein there is a continuous one-to-one correspondence between the means for detecting smoke in the first region and the first reflecting element; and means for detecting smoke in a second region of the structure different from the first region of the structure, comprising:
- means for radiating a second beam in a second direction toward a second reflecting element, wherein the first direction is different than the second direction; and
- means for receiving a second reflection of the second beam from the second reflecting element, wherein there is a continuous one-to-one correspondence between the means for detecting smoke in the second region and the second reflecting element.

15. The smoke detection system of claim 14, further comprising:
- means for containing: means for radiating the first beam, means for receiving the first reflection, means for radiating the second beam, and means for receiving the second reflection.

16. The smoke detection system of claim 14, wherein the first direction is angled N degrees away from the second direction.

17. The smoke detection system of claim 14, further comprising:
- means for determining whether an intensity of the first reflection is below a threshold value;
- means for triggering an alert if the intensity is less than the threshold value; and
- means for refraining from triggering the alert if the intensity is equal to or greater than the threshold value.

18. The smoke detection system of claim 17, wherein the intensity of the first reflection is indicative of whether the first beam has passed through smoke.

19. The smoke detection system of claim 17, further comprising means for transmitting a message indicating a fire to a fire department or other emergency service.

20. The smoke detection system of claim 17, wherein:
- means for radiating the first beam in a first direction comprises a first beam emitter;
- means for receiving the first reflection of the first beam comprises the first beam emitter;
- means for radiating the second beam in the second direction comprises a second beam emitter;
- means for receiving the second reflection of the second beam comprises the second beam emitter;
- means for determining whether the intensity of the first reflection is below a threshold value comprises one or more memories, individually or in combination, having instructions, and one or more processors, individually or in combination, configured to execute the instructions;
- means for triggering an alert comprises the one or more memories and the one or more processors; and
- means for refraining from triggering the alert comprises the one or more memories and the one or more processors.

* * * * *